(12) United States Patent
Li et al.

(10) Patent No.: US 9,584,184 B2
(45) Date of Patent: Feb. 28, 2017

(54) UNIFIED FRONT-END RECEIVER INTERFACE FOR ACCOMMODATING INCOMING SIGNALS VIA AC-COUPLING OR DC-COUPLING

(71) Applicant: QUALCOMM Incorporated, San Diego, CA (US)

(72) Inventors: Miao Li, San Diego, CA (US); Xiaohua Kong, San Diego, CA (US); Jingcheng Zhuang, San Diego, CA (US); Wei Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/784,821

(22) Filed: Mar. 5, 2013

(65) Prior Publication Data

US 2014/0256276 A1 Sep. 11, 2014

(51) Int. Cl.
*H04B 1/06* (2006.01)
*H04B 7/00* (2006.01)
*H04B 3/50* (2006.01)
*H04B 3/30* (2006.01)

(52) U.S. Cl.
CPC ............... *H04B 3/50* (2013.01); *H04B 3/30* (2013.01)

(58) Field of Classification Search
CPC . H04B 1/30; H04B 1/18; H04B 10/40; H04B 10/564; G06F 11/3041
USPC ............... 455/232.1, 234.1, 249.1, 324
See application file for complete search history.

(56) References Cited

U.S. PATENT DOCUMENTS

| | | | |
|---|---|---|---|
| 7,146,141 B2 | 12/2006 | Chen | |
| 7,436,216 B1 * | 10/2008 | Brunn et al. | 326/83 |
| 7,519,130 B2 | 4/2009 | Hsu et al. | |
| 7,660,350 B2 | 2/2010 | Hsu et al. | |
| 2004/0189339 A1 * | 9/2004 | Conner | G01R 31/2844 324/762.01 |
| 2004/0204037 A1 | 10/2004 | He et al. | |
| 2006/0159200 A1 * | 7/2006 | Hsu et al. | 375/316 |
| 2007/0290735 A1 * | 12/2007 | Ali et al. | 327/333 |
| 2008/0088294 A1 * | 4/2008 | Sikora et al. | 323/318 |
| 2008/0298520 A1 * | 12/2008 | Hsu et al. | 375/345 |
| 2009/0315610 A1 * | 12/2009 | Han et al. | 327/333 |
| 2010/0278226 A1 * | 11/2010 | Kushnick | 375/224 |
| 2011/0165848 A1 | 7/2011 | Gorbachov et al. | |
| 2012/0133414 A1 * | 5/2012 | Zhuang | 327/333 |

\* cited by examiner

*Primary Examiner* — Yuwen Pan
*Assistant Examiner* — Fatuma Sherif
(74) *Attorney, Agent, or Firm* — Loza & Loza LLP (57) ABSTRACT

Techniques for accommodating an incoming signal at a front-end receiver via AC-coupling or DC-coupling are described herein. In one aspect, a front-end receiver comprises a differential input with a first data line and a second data line for receiving an incoming signal. The front-end receiver also comprises an AC-coupled switch coupled to the differential input, wherein the AC-coupled switch is configured to both perform high-pass filtering on the incoming signal and offset the filtered incoming signal with a DC-offset voltage if an AC-coupling mode of the receiver is enabled. The front-end receiver further comprises a DC-coupled switch coupled to the differential input, wherein the DC-coupled switch is configured to shift a common-mode voltage of the incoming signal if a DC-coupling mode of the receiver is enabled.

28 Claims, 6 Drawing Sheets

UNIFIED FRONT-END RECEIVER INTERFACE FOR ACCOMMODATING INCOMING SIGNALS VIA AC-COUPLING OR DC-COUPLING

BACKGROUND

Field

Aspects of the present disclosure relate generally to receivers, and more particularly, to front-end receivers for accommodating incoming signals via alternating current (AC)-coupling or direct current (DC)-coupling.

Background

A device may include a front-end analog receiver for receiving an incoming signal from another device. The front-end receiver may perform front-end processing on the received signal (e.g., equalization, filtering, amplification, etc.) before forwarding the signal to other components in the device for further processing.

A front-end receiver may receive different types of incoming signals complying with different standards, such as Peripheral Component Interconnect Express (PCIE), Universal Serial Bus (USB), Serial Advanced Technology Attachment (SATA), embedded DisplayPort (eDP), M-PHY, etc. Some types of signals may require AC-coupling at the front-end receiver, while other types of signals may require DC-coupling at the front-end receiver. A typical analog front-end receiver is either AC-coupled or DC-coupled depending on a particular application or type of incoming signal being received.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a front-end receiver is described herein. The front-end receiver comprises a differential input with a first data line and a second data line for receiving an incoming signal. The front-end receiver also comprises an AC-coupled switch coupled to the differential input, wherein the AC-coupled switch is configured to both perform high-pass filtering on the incoming signal and offset the filtered incoming signal with a DC-offset voltage if an AC-coupling mode of the receiver is enabled. The front-end receiver further comprises a DC-coupled switch coupled to the differential input, wherein the DC-coupled switch is configured to shift a common-mode voltage of the incoming signal if a DC-coupling mode of the receiver is enabled.

A second aspect relates to a method operable by a front-end receiver for handling an incoming signal. The method comprises receiving the incoming signal via a differential input with a first data line and a second data line. The method also comprises, if an AC-coupling mode of the receiver is enabled, performing the steps of performing high-pass filtering on the incoming signal, and offsetting the filtered incoming signal with a DC-offset voltage. The method further comprises, if a DC-coupling mode of the receiver is enabled, shifting a common-mode voltage of the incoming signal.

A third aspect relates to an apparatus for handling an incoming signal. The apparatus comprises means for receiving the incoming signal via a differential input with a first data line and a second data line. The apparatus also comprises means for performing high-pass filtering on the incoming signal if an AC-coupling mode is enabled, and means for offsetting the filtered incoming signal with a DC-offset voltage if the AC-coupling mode is enabled. The apparatus further comprises means for shifting a common-mode voltage of the incoming signal if a DC-coupling mode is enabled.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
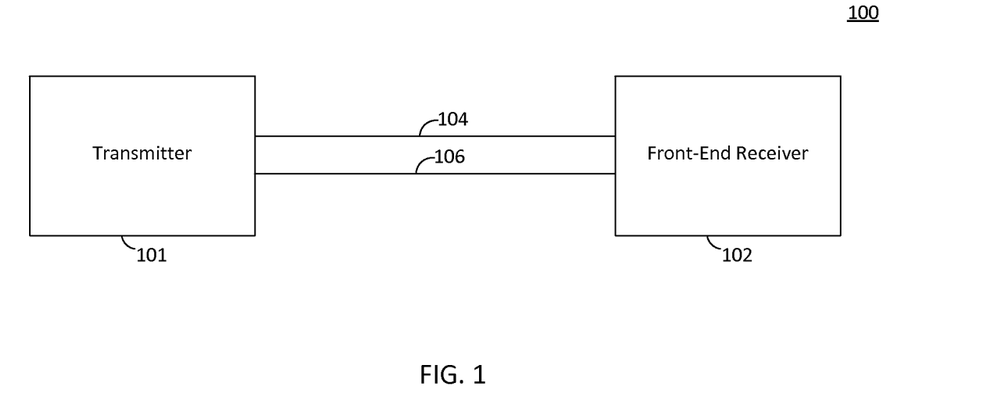
FIG. 1 shows an example of a system including a transmitter and a front-end receiver.

FIG. 1 shows an example of a system 100 including a transmitter 101 and a front-end receiver 102. The transmitter 101 may be located on a first device and the front-end receiver 102 may be located on a second device, in which the transmitter 101 and the front-end receiver 102 are used to transfer data from the first device to the second device over first and second transmission lines 104 and 106. The first and second transmission lines 104 and 106 may comprise a twisted wire pair, traces on a printed circuit board and/or chip, conductors in a coaxial cable or another type of cable, etc. The transmitter 101 transmits a differential data signal to the front-end receiver 102 over the first and second transmission lines 104 and 106. The front-end receiver 102 performs front-end processing on the received signal before forwarding the signal to other components in the second device for further processing.

Different types of signals complying with different standards may be transmitted from the transmitter 101 to the front-end receiver 102 over the first and second transmission lines 104 and 106. For example, when the transmitter 101 and the front-end receiver 102 are used to communicate data between a storage device and a computing device, the signal may comply with a Serial Advanced Technology Attachment (SATA) standard. In another example, when the transmitter 101 and the front-end receiver 102 are used to communicate data between a peripheral device and a computing device, the signal may comply with a Universal Serial Bus (USB) standard or a Peripheral Component Interconnect Express (PCIE) standard. Some types of signals may require AC-coupling at the front-end receiver 102, while other types of signals may require DC-coupling at the front-end receiver 102. For example, a particular type of signal may require either AC-coupling or DC-coupling at the front-end receiver 102 depending on the particular application and/or standard of the signal.

Thus, it is desirable that the front-end receiver 102 be capable of providing both AC-coupling and DC-coupling to accommodate different types of incoming signals complying with different standards. This allows the same front-end receiver design to be used for different applications and/or standards.

Figure 2:
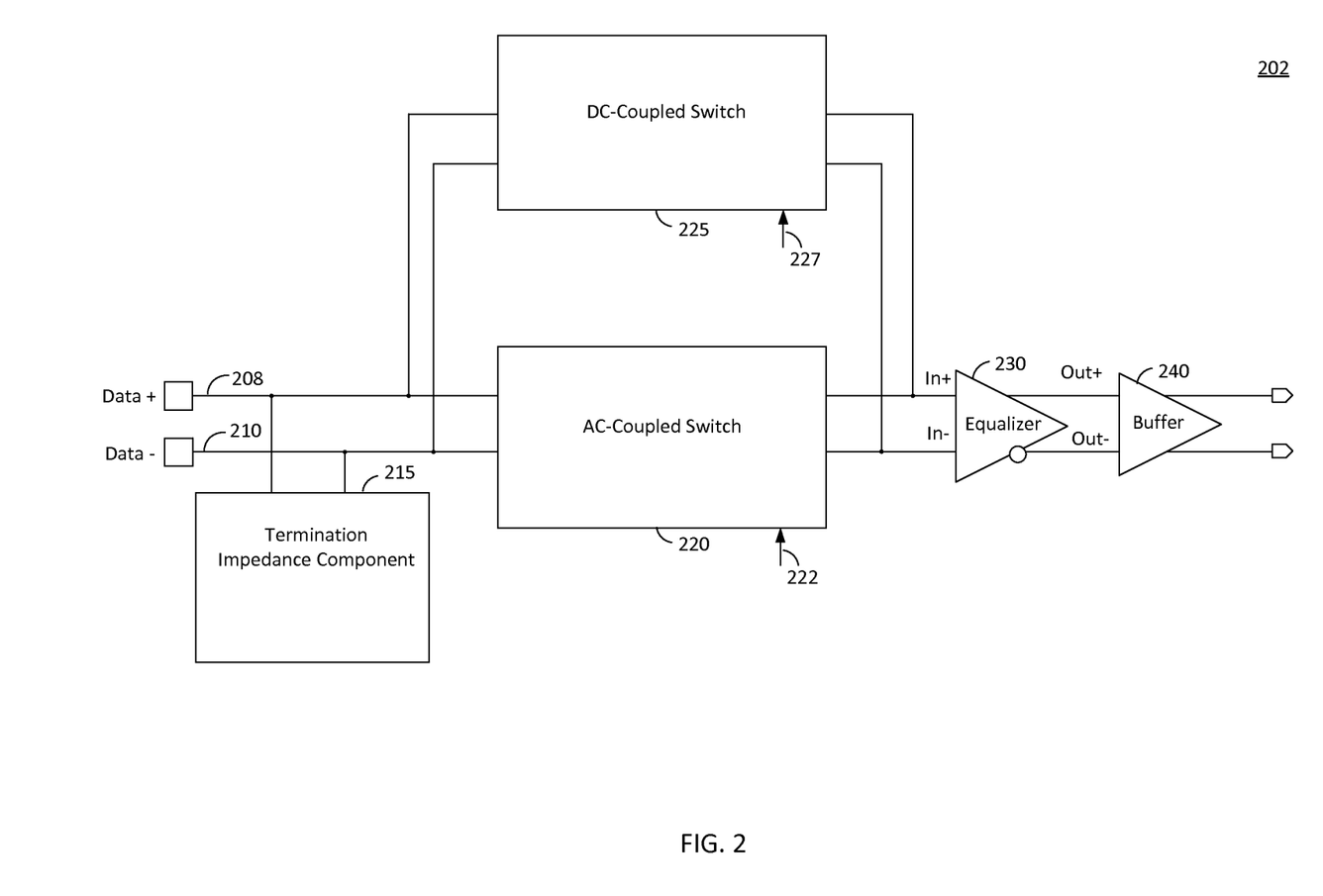
FIG. 2 shows a front-end receiver according to an embodiment of the present disclosure.

FIG. 2 shows a front-end receiver 202 capable of providing AC-coupling and DC-coupling according to an embodiment of the present disclosure. The receiver 202 receives an incoming differential signal from the transmitter 101 via a differential input with a first data line 208 coupled to the first transmission line 104 and a second data line 210 coupled to the second transmission line 106.

The front-end receiver 202 comprises an AC-coupled switch 220, a DC-coupled switch 225, a termination impedance component 215, an equalizer 230, and a buffer 240. The AC-coupled switch 220 is configured to AC-couple an incoming signal received on the first and second data lines 208 and 210 to the equalizer 230, and the DC-coupled switch 225 is configured to DC-couple an incoming signal received on the first and second data lines 208 and 210 to the equalizer 230. The AC-coupled switch 220 may include an AC-couple-enable input 222 for activating the AC-coupled switch 220, and the DC-coupled switch 225 may include a DC-couple-enable input 227 for activating the DC-coupled switch 225.

In one embodiment, one of the AC-coupled switch 220 and the DC-coupled switch 225 is activated at a time (e.g., depending on whether an incoming signal requires AC-coupling or DC-coupling) with the other switch deactivated. For example, the AC-coupled switch 220 may be activated and the DC-coupled switch 225 deactivated to couple a first type of incoming signal (e.g., a signal complying with a PCIE standard, a USB standard, a SATA standard, an embedded DisplayPort (eDP) standard, etc.) to the equalizer 230 via the AC-coupled switch 220. The AC-coupled switch 220 may be activated by inputting a logic one to the AC-couple-enable input 222, and the DC-coupled switch 225 may be deactivated by inputting a logic zero to the DC-couple-enable input 227.

The DC-coupled switch 225 may be activated and the AC-coupled switch 220 deactivated to couple a second type of incoming signal (e.g., a burst-mode signal complying with an M-PHY standard or another standard) to the equalizer 230 via the DC-coupled switch 225. For example, DC-coupling may be more suitable for a burst-mode signal that requires a fast settling time to meet a particular standard. This is because DC-coupling typically has much faster settling times for burst-mode signals than AC-coupling (e.g., due to large RC time-constants associated with AC-coupling), and therefore may be better suited for coupling burst-mode signals. The DC-coupled switch 225 may be activated by inputting a logic one to the DC-couple-enable input 227, and the AC-coupled switch 220 may be deactivated by inputting a logic zero to the AC-couple-enable input 222.

The equalizer 230 may be configured to reduce distortion in an incoming signal due to bandwidth limitations of the transmission lines 104 and 106. For example, the transmission lines 104 and 106 may distort the signal by attenuating the signal at higher frequencies. In this example, the equalizer 230 may peak the incoming signal at higher frequencies to compensate for signal attenuation at higher frequencies, and therefore reduce distortion in the signal.

In order for the equalizer 230 to function properly, the differential input (In+ and In−) of the equalizer 230 may need to be DC biased within a certain voltage range. In this regard, the AC-coupled switch 220 and the DC-coupled switch 225 may each be configured to properly DC bias the differential input of the equalizer 230, as discussed further below.

The buffer 240 may be coupled to a differential output (Out+ and Out−) of the equalizer 230, and configured to provide current gain. This may be done to increase the current driving capability of the front-end receiver 202.

The termination impedance component 215 may be coupled to the first and second data lines 208 and 210, and configured to provide impedance matching between the first and second transmission lines 104 and 106 and the receiver input. For example, the termination impedance component 215 may provide an impedance between the first and second data lines 208 and 210 matching the characteristic impedances of the first and second termination lines 104 and 106. The impedance of the termination impedance component 215 may be referred to as a termination impedance since the first and second transmission lines 104 and 106 terminate at the receiver input.

Figure 3:
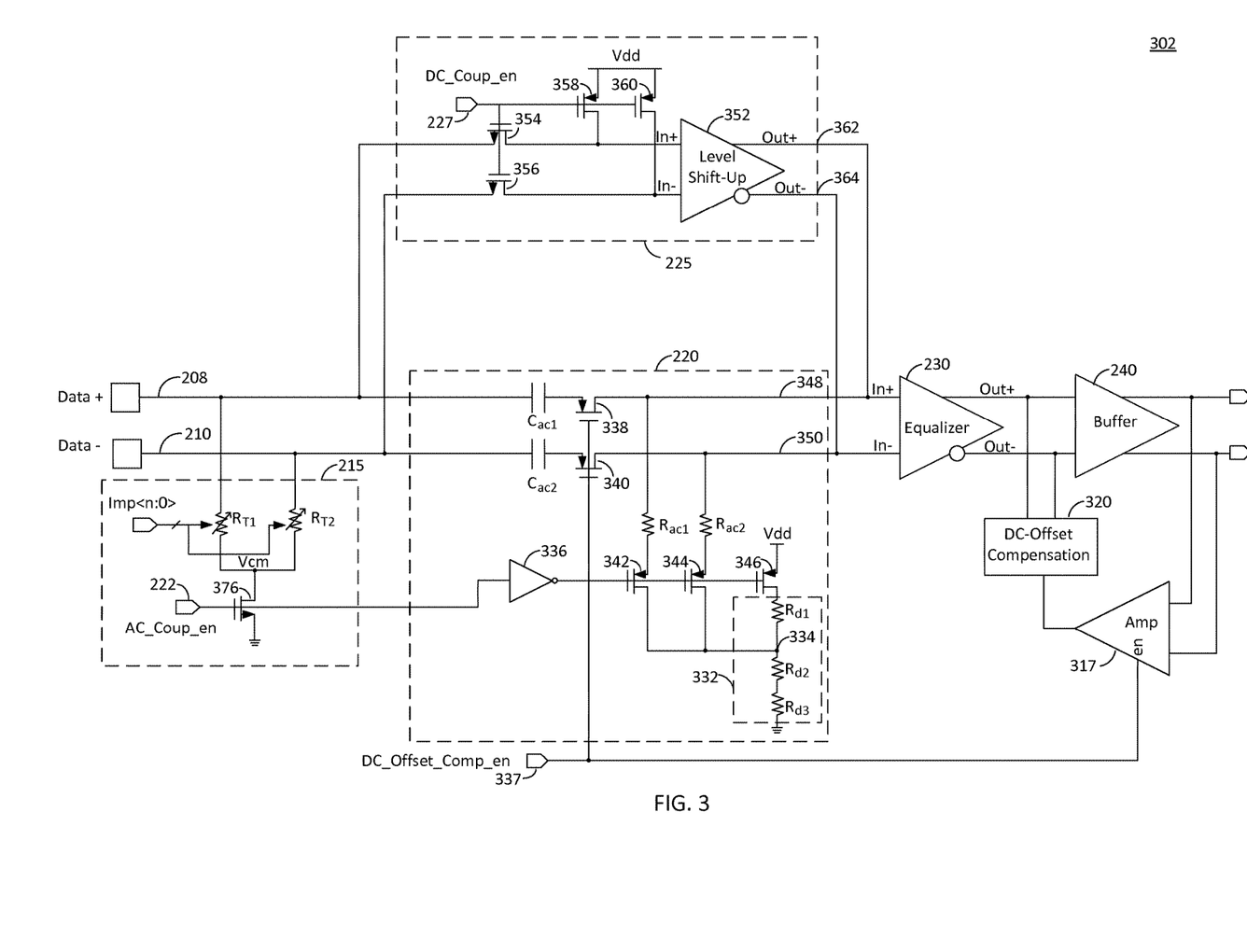
FIG. 3 shows an exemplary implementation of the front-end receiver according to an embodiment of the present disclosure.

FIG. 3 shows an exemplary implementation of the front-end receiver 302 according to an embodiment of the present disclosure.

The AC-coupled switch 220 comprises first and second AC-coupling capacitors $C_{ac1}$ and $C_{ac2}$, first and second AC-coupling resistors $R_{ac1}$ and $R_{ac2}$, first and second AC-coupling switches 338 and 340, a voltage divider 332, voltage-divider switches 342, 344 and 346, and an inverter 336. The voltage divider 332 comprises a plurality of resistors $R_{d1}$, $R_{d2}$ and $R_{d3}$ coupled in series between a supply voltage Vdd and ground.

In the example shown in FIG. 3, each of the switches 338-346 comprises a p-type metal-oxide-semiconductor (PMOS) transistor that is turned on by applying a logic zero to the gate of the PMOS transistor and turned off by applying a logic one to the gate of the PMOS transistor. The gates of the PMOS transistors of the voltage-divider switches 342-346 are coupled to the AC-couple-enable input 222 (labeled AC_Coup_en) via the inverter 336. The gates of the PMOS transistors of the AC-coupling switches 338 and 340 are coupled to a DC-offset-compensation-enable input 337 (labeled DC_Offset_Comp_en), which is used to support a DC-offset-compensation mode, discussed further below.

The AC-coupled switch 220 is activated by inputting a logic one to the AC-couple-enable input 222 and a logic zero to the DC-offset-compensation-enable input 337. The inverter 336 inverts the logic one at the AC-couple-enable input 222 into a logic zero, which turns on the PMOS transistors of the voltage-divider switches 342, 344 and 346. The logic zero at the DC-offset-compensation-enable input 337 turns on the PMOS transistors of the AC-coupling switches 338 and 340. Thus, when the AC-coupled switch 220 is activated, all of the switches 338-346 are turned on.

When the AC-coupled switch 220 is activated, the first AC-coupling switch 338 couples the first AC-coupling capacitor $C_{ac1}$ to the first AC-coupling resistor $R_{ac1}$ to form a first high-pass filter on the first data line 208. Similarly, the second AC-coupling switch 340 couples the second AC-coupling capacitor $C_{ac2}$ to the second AC-coupling resistor $R_{ac2}$ to form a second high-pass filter on the second data line 210. As a result, if an incoming signal includes an AC component and a DC component, then the high-pass filters couple the AC component of the incoming signal to the equalizer 230 while filtering out (attenuating) the DC component of the incoming signal.

When the AC-coupled switch 220 is activated, the voltage-divider switches 342-346 couple the voltage divider 332 to the supply voltage Vdd and to first and second output lines 348 and 350 of the AC-coupled switch 220. The voltage divider 332 produces a DC-offset voltage at node 334. The DC-offset voltage is determined by the supply voltage Vdd, and the ratio of the resistance of resistors $R_{d2}$ and $R_{d3}$ and the total resistance of the voltage divider 332. For example, the supply voltage Vdd may be approximately 0.9 V, and the resistances of the resistors $R_{d1}$, $R_{d2}$ and $R_{d3}$ may be chosen to achieve a desired DC-offset voltage between 0.9 V and zero volts. In one embodiment, the DC-offset voltage may be set to a voltage that properly DC biases each input In+ and In− of the equalizer 230.

The DC-offset voltage from the voltage divider 332 is coupled to the first and second output lines 348 and 350 of the AC-coupled switch 220. The first and second output lines 348 and 350 output the high-pass filtered incoming signal offset by the DC-offset voltage from the voltage divider 332 to the differential input (In+ and In−) of the equalizer 230. Thus, the DC-offset voltage is applied to each input In+ and In− of the equalizer 230, and therefore DC biases each input In+ and In− of the equalizer 230.

The DC-coupled switch 225 comprises first and second DC-coupling switches 354 and 356, first and second pull-up switches 358 and 360, and a voltage-level shifter 352. The level shifter 352 is configured to shift the common-mode voltage of an incoming signal, as discussed further below.

In the example shown in FIG. 3, each of the DC-coupling switches 354 and 356 comprises an n-type metal-oxide-semiconductor (NMOS) transistor that is turned on by applying a logic one to the gate of the NMOS transistor and turned off by applying a logic zero to the gate of the NMOS transistor. Each of the pull-up switches 358 and 360 comprises a PMOS transistor. The gates of the NMOS transistors of the DC-coupling switches 354 and 356 are coupled to the DC-couple-enable input 227. The gates of the PMOS transistors of the pull-up switches 358 and 360 are also coupled to the DC-couple-enable input 227.

The DC-coupled switch 225 is activated by inputting a logic one to the DC-couple-enable input 227. This turns on the NMOS transistors of the DC-coupling switches 354 and 356, and turns off the PMOS transistors of the pull-up switches 358 and 360.

When the DC-coupled switch 225 is activated, the DC-coupling switches 354 and 356 couple the incoming signal to the differential input (In+ and In−) of the level shifter 352. The level shifter 352 shifts the common-mode voltage of the incoming signal (e.g., to properly DC bias the equalizer 230). For example, the level shifter 352 may shift the common-mode voltage upward (e.g., when the incoming signal is a low-voltage burst-mode signal). The level-shifted signal is output at a differential output (Out+ and Out−) of the level shifter 352. The differential output (Out+ and Out−) of the level shifter 325 is coupled to the differential input (In+ and In−) of the equalizer 230 via third and fourth output lines 362 and 364.

Figure 4:
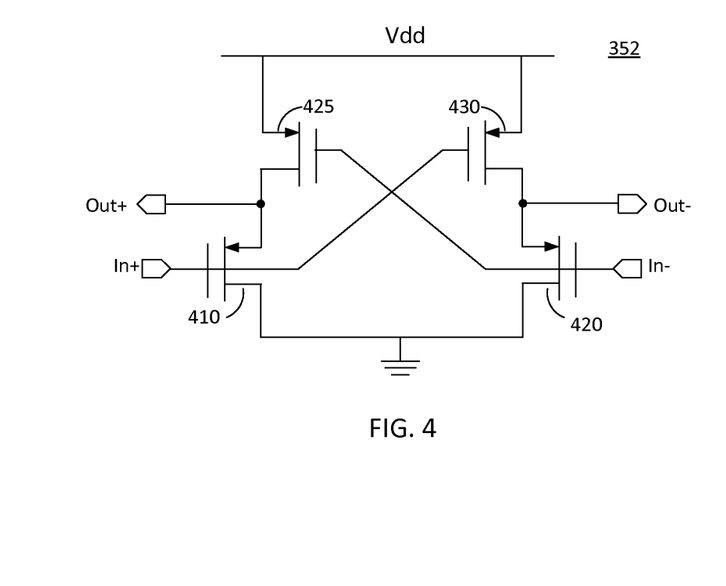
FIG. 4 shows a level shifter according to an embodiment of the present disclosure.

FIG. 4 shows an exemplary implementation of the level shifter 352 having a PMOS transistor over PMOS transistor structure according to an embodiment of the present disclosure. The level shifter 352 comprises a first PMOS transistor 410, a second PMOS transistor 420, a third PMOS transistor 425, and a fourth PMOS transistor 430. The sources of the third PMOS transistor 425 and the fourth PMOS transistor 430 are coupled to the supply voltage Vdd. The source of the first PMOS transistor 410 is coupled to the drain of the third PMOS transistor 425, and the drain of the first PMOS transistor 410 is coupled to ground. The source of the second PMOS transistor 420 is coupled to the drain of the fourth PMOS transistor 430, and the drain of the second PMOS transistor 420 is coupled to ground.

The plus input In+ of the level shifter 352 is coupled to the gate of the first PMOS transistor 410, and the minus input In− of the level shifter 352 is coupled to the gate of the second PMOS transistor 420. The plus output Out+ of the level shifter 352 is coupled between the drain of the third PMOS transistor 425 and the source of the first PMOS transistor 410. The minus output Out− of the level shifter 352 is coupled between the drain of the fourth PMOS transistor 430 and the source of the second PMOS transistor 420.

The gates of the PMOS transistors 410, 420, 425 and 430 are cross-coupled, in which the gate of the first PMOS transistor 410 is coupled to the gate of the fourth PMOS transistor 430, and the gate of the second PMOS transistor 420 is coupled to the gate of the third PMOS transistor 425. Thus, the gates of the first PMOS transistor 410 and the fourth PMOS transistor 430 are coupled to the plus input In+ of the level shifter 352. The gates of the second PMOS transistor 420 and the third PMOS transistor 425 are coupled to the minus input In− of the level shifter 352.

Operation of the level shifter 352 will now be described according to an embodiment of the present disclosure. In this discussion, it is assumed that the incoming signal is a differential signal made up of two signals (one on each of the first and second data lines 208 and 210) that are the logical inverse of each other. The incoming signal may be a low-voltage signal, in which a logic one for the incoming signal corresponds to a voltage below the supply voltage Vdd. For example, a logic one for the incoming signal may correspond to a voltage of a few hundred millivolts (e.g., 400 mV), while the supply voltage may be approximately 0.9 V. In this example, the common-mode voltage of the incoming signal may be too low to properly DC bias the equalizer 230.

When the incoming signal applies a logic one to the plus input In+ of the level shifter 352, the incoming signal applies a logic zero to the minus input In− of the level shifter 352. In this case, the logic one is applied to the gate of the first PMOS transistor 410, and the logic zero is applied to the gate of the second PMOS transistor 420.

The logic zero at the gate of the second PMOS 420 is cross-coupled to the gate of the third PMOS transistor 425, causing the third PMOS transistor 425 to turn on. Since the third PMOS transistor 425 is turned on, the third PMOS transistor 325 pulls up the voltage at the plus output Out+ of the level shifter 352 to approximately the supply voltage Vdd.

The logic one at the gate of the first PMOS transistor 410 is cross-coupled to the gate of the fourth PMOS transistor 430. As discussed above, a logic one of the incoming signal may correspond to a voltage that is below the supply voltage Vdd. As a result, the gate of the fourth PMOS transistor 430 may be below the supply voltage Vdd, resulting in a source-to-gate voltage drop across the fourth PMOS transistor 430. The source-to-gate voltage may be large enough to turn on the fourth PMOS transistor 430, in which case the fourth PMOS transistor 430 conducts a current.

As a result, the second PMOS transistor 420 may need to be turned on to sink the current flowing through the fourth PMOS transistor 430, resulting in a source-to-gate voltage drop (denoted $V_{sg\_on}$) across the second PMOS transistor 420. The source-to-gate voltage $V_{sg\_on}$ may be approximately equal to the threshold voltage $V_t$ of the second PMOS transistor 420 or a higher voltage. As a result, the voltage at the minus output Out− of the level shifter 352 (which is coupled to the source of the second PMOS transistor 420) is approximately equal to $V_{sg\_on}$ instead of approximately ground. A similar analysis can be carried out for the case in which a logic zero is applied to the plus input In+ of the level shifter 352, and a logic one is applied to the minus input In− of the level shifter 352.

Thus, the output voltage swing of the level shifter 352 may be between $V_{sg\_on}$ and approximately Vdd, where $V_{sg\_on}$ is approximately equal to the threshold voltage $V_t$ or a higher voltage. The common-mode voltage $V_{out\_cm}$ at the differential output (Out+ and Out−) of the level shifter 352 may be approximately given by:

$$V_{out\_cm}=(Vdd+V_{sg\_on})/2 \qquad (Eq.\ 1)$$

Thus, the level shifter 352 shifts up the common-mode voltage of the incoming signal to the output common-mode voltage $V_{out\_cm}$, which may be used to DC bias each input In+ and In− of the equalizer 230.

Thus, the AC-coupled switch 220 and the DC-coupled switch 225 of the receiver 302 may be selectively activated to accommodate different types of incoming signals. For example, the AC-coupled switch 220 may be activated and the DC-coupled switch 225 deactivated to couple the first type of incoming signal (e.g., a signal complying with a PCIE standard, a USB standard, a SATA standard, an eDP standard, etc.) to the equalizer 230 via the AC-coupled switch 220. The DC-coupled switch 225 may be activated and the AC-coupled switch 220 deactivated to couple the second type of incoming signal (e.g., a signal complying with an M-PHY standard) to the equalizer 230 via the DC-coupled switch 225.

Figure 5:
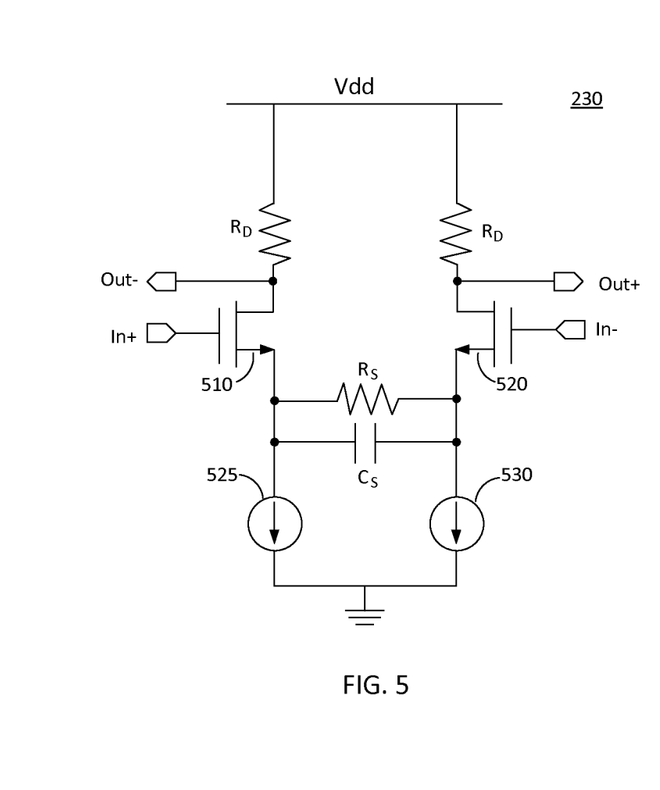
FIG. 5 shows an equalizer according to an embodiment of the present disclosure.

FIG. 5 shows an exemplary implementation of the equalizer 230 according to an embodiment of the present disclosure. The equalizer 230 is a differential amplifier with RC degeneration. The equalizer 230 comprises a first input NMOS transistor 510, a second input NMOS transistor 520, a first current source 525, a second current source 530, two drain resistors $R_D$, a degeneration resistor $R_S$, and a degeneration capacitor $C_S$. Each of the drain resistors $R_D$ is coupled between the supply voltage Vdd and the drain of one of the input NMOS transistor 510 and 520. The source of the first input NMOS transistor 510 is coupled to the first current source 525, and the source of the second input NMOS transistor 520 is coupled to the second current source 530. Each of the degeneration resistor $R_S$ and the degeneration capacitor $C_S$ is coupled between the sources of the input NMOS transistors 510 and 520.

The plus input In+ of the equalizer 230 is coupled to the gate of the first NMOS transistor 510, and the minus input In− of the equalizer 230 is coupled to the gate of the second input NMOS transistor 520. The plus output Out+ of the equalizer 230 is coupled between the drain of the second input NMOS transistor 520 and the respective drain resistor $R_D$, and the minus output OUT− of the equalizer 230 is coupled between the drain of the first input NMOS transistor 510 and the respective drain resistor $R_D$.

The low frequency gain of the equalizer 230 may be given approximately by:

$$G=gm \cdot R_D/(1+gm \cdot R_S/2) \qquad (Eq.\ 2)$$

where gm is the transconductance of the input NMOS transistors 510 and 520, and G is the low frequency gain.

At higher frequencies, the degeneration capacitor $C_S$ shorts the degeneration resistor $R_S$, causing the gain of the equalizer 230 to increase, and peak at approximately:

$$G_P=gm \cdot R_D \qquad (Eq.\ 3)$$

where $G_P$ is the peak gain of the equalizer 230.

Thus, at higher frequencies, the gain of the equalizer 230 increases to compensate for signal attenuation in the transmission lines 104 and 106 at higher frequencies.

To function properly, the input NMOS transistors 510 and 520 need to be biased with a DC voltage sufficient to turn on. To this end, the voltage divider 332 of the AC-coupled switch 220 may be configured to produce a DC-offset voltage sufficient to turn on the input NMOS transistors 510 and 520 when the AC-coupled switch 220 is activated. The level shifter 352 of the DC-coupled switch 225 may be configured to shift the common-mode voltage of an incoming signal to a voltage level sufficient to turn on the input NMOS transistors 510 and 520 when the DC-coupled switch 225 is activated.

Referring back to FIG. 3, the impedance termination component 215 comprises a first adjustable termination resistor $R_{T1}$, a second adjustable termination resistor $R_{T2}$, and an impedance switch 376. The first termination resistor $R_{T1}$ is coupled between the first data line 208 and the impedance switch 376, and the second termination resistor $R_{T2}$ is coupled between the second data line 210 and the impedance switch 376. The impedance switch 376 selectively couples the termination resistors $R_{T1}$ and $R_{T2}$ to ground, as discussed further below. The impedance of the first termination resistor $R_{T1}$ and the impedance of the second termination resistor $R_{T2}$ may be adjusted to accommodate different types of transmission lines and/or different types of incoming signals. An impedance control signal (Imp<n:0>) controls the impedance of the first termination resistor $R_{T1}$ and the impedance of the second termination resistor $R_{T2}$, as discussed further below.

The first adjustable termination resistor $R_{T1}$ may comprise a plurality of resistors (not shown) and a plurality of resistor switches (not shown), in which each resistor switch controls whether a respective one of the resistors is switched into a resistor network that determines the impedance of the first termination resistor $R_{T1}$. When a resistor is switched into the resistor network by the respective resistor switch, the resistor contributes to the impedance of the resistor network, and therefore the impedance of the first termination resistor $R_{T1}$. The resistor network may have various configurations. Thus, the impedance of the first termination resistor $R_{T1}$ may be adjusted by selectively turning on one or more of the resistor switches, and therefore selectively switching one or more of the resistors into the resistor network. In this example, the impedance control signal (Imp<n:0>) may be a multiple bit signal that selectively turns on one or more of the resistor switches to achieve a desired impedance. The second termination resistor $R_{T2}$ may be similarly implemented.

When the AC-coupled switch 220 is activated, the impedance switch 376 is turned on. As a result, the first termination resistor $R_{T1}$ is coupled between the first data line 208 and ground, and the second termination resistor $R_{T2}$ is coupled between the second data line 210 and ground. In this case, the impedance of the first termination resistor $R_{T1}$ may be adjusted to match the impedance (e.g., 50Ω) of the first transmission line 104, and the impedance of the second termination resistor $R_{T2}$ may be adjusted to match the impedance (e.g., 50Ω) of the second transmission line 106.

When the DC-coupled switch 225 is activated, the impedance switch 376 is turned off. As a result, the first termination resistor $R_{T1}$ and the second termination resistor $R_{T2}$ are coupled in series between the first and second data lines 208 and 210. This is equivalent to a termination resistor coupled across the first and second data lines 208 and 210. In this case, the sum of the impedances of the first and second termination resistors $R_{T1}$ and $R_{T2}$ may be matched to the sum of the impedances (e.g., 100Ω) of the transmission lines 104 and 106. If the impedances of the first and second termination resistors $R_{T1}$ and $R_{T2}$ are balanced, then a common-mode voltage Vcm of the incoming signal may appear at the node between the first and second termination resistors $R_{T1}$ and $R_{T2}$, as shown in FIG. 3.

In one embodiment, the impedance switch 376 comprises an NMOS transistor having a gate coupled to the AC-couple-enable input 222. When the AC-coupled switch 220 is activated, a logic one is input to the AC-couple-enable input 222, which turns on the NMOS transistor of the impedance switch 376. In this case, the impedance switch 376 couples the first and second termination resistors $R_{T1}$ and $R_{T2}$ to ground. When the DC-coupled switch 225 is activated, a logic zero is input to the AC-couple-enable input 222, which turns off the NMOS transistor of the impedance switch 376. In this case, the first and second termination resistors $R_{T1}$ and $R_{T2}$ are coupled in series between the first and second data lines 208 and 210.

Figure 6:
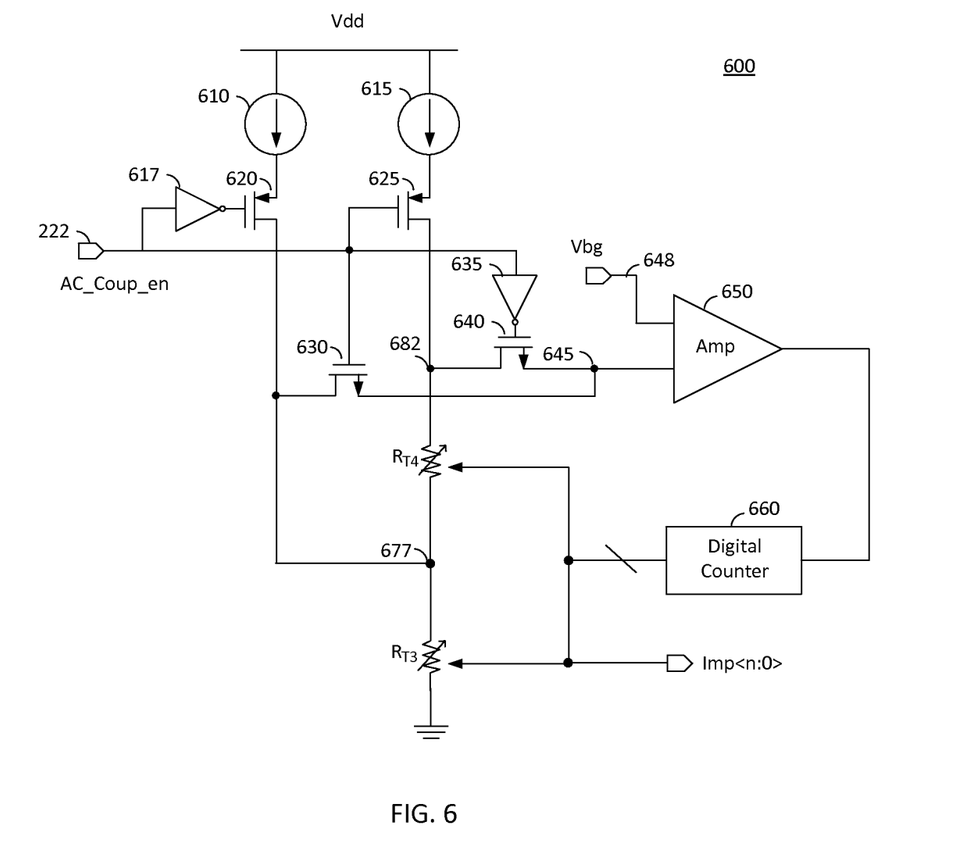
FIG. 6 shows a circuit for controlling a termination impedance of the front-end receiver according to an embodiment of the present disclosure.

FIG. 6 shows an impedance control circuit 600 according to an embodiment of the present disclosure. The impedance control circuit 600 sets the impedance control signal (Imp<n:0>) to achieve a desired impedance at the impedance termination component 215. The impedance control circuit 600 comprises a first current source 610, a second current source 615, a first inverter 617, a second inverter 635, an amplifier 650, a digital counter 660, and a plurality of switches 620, 625, 630 and 640. The impedance control circuit 600 also comprises a third adjustable resistor $R_{T3}$ and a fourth adjustable resistor $R_{T4}$.

The impedance control 600 sets the impedance control signal (Imp<n:0>) for AC-coupling when the AC-couple-enable input 222 (AC_Coup_en) is a logic one, and sets the impedance control signal (Imp<n:0>) for DC-coupling when the AC-couple-enable input 222 (AC_Coup_en) is a logic zero.

When the AC-couple-enable input 222 (AC_Coup_en) is a logic one, switches 620 and 630 are turned on, and switches 625 and 640 are turned off. As a result, the current from the first current source 610 flows through the third adjustable resistor $R_{T3}$ via switch 620. The voltage drop across the third adjustable resistor $R_{T3}$ at node 677 is coupled to a first input 645 of the amplifier 650 via switch 630. A second input 648 of the amplifier 650 is coupled to a reference voltage Vbg that represents a desired impedance. The reference voltage Vbg may be given by:

$$Vbg = I_{C1} \cdot Z_{d1} \quad \text{(Eq. 4)}$$

where $I_{C1}$ is the current of the first current source 610, and $Z_{d1}$ is the desired impedance. Thus, the third adjustable resistor $R_{T3}$ may be adjusted to achieve the desired impedance by adjusting the impedance of the third adjustable resistor $R_{T3}$ until the voltage across the third adjustable resistor $R_{T3}$ is approximately equal to the reference voltage Vbg.

The amplifier 650 amplifies the difference between the reference voltage Vbg and the voltage across the third adjustable resistor $R_{T3}$. The digital counter 660 then adjusts the impedance control signal (Imp<n:0>) to reduce the difference between the reference voltage Vbg and the voltage across the third adjustable resistor $R_{T3}$ indicated by the amplifier output.

The third adjustable resistor $R_{T3}$ may be configured such that, when the impedance control signal (Imp<n:0>) is adjusted to achieve a desired impedance at the third adjustable resistor $R_{T3}$, the same impedance control signal (Imp<n:0>) achieves a desired impedance at each of the first and second termination resistors $R_{T1}$ and $R_{T2}$. For example, the third adjustable resistor $R_{T3}$ may have the same or similar construction as each of the first and second termination resistors $R_{T1}$ and $R_{T2}$.

When the AC-couple-enable input 222 (AC_Coup_en) is a logic zero, switches 620 and 630 are turned off, and switches 625 and 640 are turned on. As a result, the current from the second current source 615 flows through the third and fourth adjustable resistors $R_{T3}$ and $R_{T4}$ via switch 625. In this case, the third and fourth adjustable resistors $R_{T3}$ and $R_{T4}$ are coupled in series. The voltage drop across the third and fourth adjustable resistors $R_{T3}$ and $R_{T4}$ at node 682 is coupled to the first input 645 of the amplifier 650 via switch 640. The second input 648 of the amplifier 650 is coupled to the reference voltage Vbg. The reference voltage Vbg may be given by:

$$Vbg = I_{C2} \cdot Z_{d2} \quad \text{(Eq. 5)}$$

where $I_{C2}$ is the current of the second current source 615, and $Z_{d2}$ a the desired impedance across the third and fourth adjustable resistors $R_{T3}$ and $R_{T4}$. Thus, the third and fourth adjustable resistors $R_{T3}$ and $R_{T4}$ may be adjusted to achieve the desired impedance by adjusting their impedances until the voltage across them is approximately equal to the reference voltage Vbg.

The amplifier 650 amplifies the difference between the reference voltage Vbg and the voltage across the third and fourth adjustable resistors $R_{T3}$ and $R_{T4}$. The digital counter 660 then adjusts the impedance control signal (Imp<n:0>) to reduce the difference indicated by the amplifier output.

The third and fourth adjustable resistors $R_{T3}$ and $R_{T4}$ may be configured such that, when the impedance control signal (Imp<n:0>) is adjusted to achieve a desired impedance across the third and fourth adjustable resistors $R_{T3}$ and $R_{T4}$, the same impedance control signal (Imp<n:0>) achieves a desired impedance across the first and second termination resistors $R_{T1}$ and $R_{T2}$.

In one embodiment, the receiver 302 may be capable of operating in a DC-offset compensation mode to adjust the DC voltages at the outputs Out+ and Out− of the equalizer 230 to be approximately equal (e.g., to reduce jitter). To support the DC-offset compensation mode, the receiver 302 may further comprise an amplifier 317, and a DC-offset compensation circuit 320, as shown in FIG. 3.

The receiver 302 may be placed in the DC-offset compensation mode by inputting a logic one to the DC-offset-compensation-enable input 337 (DC_Offset_Comp_en), and inputting a logic one to the AC-couple-enable input 222 (AC_Coup_en). The DC-coupled switch 225 is deactivated by inputting a logic zero to the DC-couple-enable input 227 (DC_Coup_en).

Inputting the logic one to the DC-offset-compensation-enable input 337 (DC_Offset_Comp_en) enables the amplifier 317, and turns off the AC-coupling switches 338 and 340. Turning off the AC-coupling switches 338 and 340 blocks incoming signals from the inputs In+ and In− of the equalizer 230. Inputting the logic one to the AC-couple-enable input 222 (AC_Coup_en) turns on the voltage divider-switches 342, 344 and 346, coupling the DC-offset voltage from the voltage divider 332 to each input In+ and In− of the equalizer 230.

The voltages at the outputs Out+ and Out− of the equalizer 230 represent the DC output voltages of the equalizer 230 since no incoming signal is input to the equalizer 230. The output voltages of the equalizer 230 are input to the amplifier 317 via the buffer 240. The amplifier 317 amplifies the difference between the output voltages, and outputs a signal to the DC-offset compensation circuit 320 indicating the difference between the output voltages.

The DC-offset compensation circuit 320 then adjusts one or both of the output voltages of the equalizer 230 to reduce the difference between the output voltages indicated by the amplifier output. For example, if the amplifier output indicates that the voltage at the plus output Out+ is larger than the voltage at the minus output Out−, then the DC-offset compensation circuit 320 may adjust the voltage at the plus output Out+ downward by drawing more DC current from the plus output Out+. The increased current increases the voltage drop across the corresponding drain resistor $R_D$ (shown in FIG. 5), thereby reducing the voltage at the plus output Out+.

Thus, the receiver 302 is capable of operating in three different modes: AC-coupling mode, DC-coupling mode, and DC-offset compensation mode. Table 1 below shows the logic values that are input to the AC-couple-enable input 222 (AC_Coup_en), the DC-couple-enable input 227 (DC_Coup_en), and the DC-offset-compensation-enable input 337 (DC_Offset_Comp_en) for the different modes of operation.

TABLE 1

| Mode | AC_Coup_en | DC_Coup_en | DC_Offset_Comp_en |
| --- | --- | --- | --- |
| AC-Coupling | 1 | 0 | 0 |
| DC-Coupling | 0 | 1 | 0 |
| DC Offset Compensation | 1 | 0 | 1 |

To enable the AC-coupling mode of operation, a logic one is input to the AC-couple-enable input 222, a logic zero is input to the DC-couple-enable input 227, and a logic zero is input to the DC-offset-compensation-enable input 337. This activates the AC-coupled switch 220 and deactivates the DC-coupled switch 225. As a result, an incoming signal received on the data lines 208 and 210 is coupled to the equalizer 230 via the AC-coupled switch 220. The AC-coupled switch 220 performs high-pass filtering on the incoming signal, and inputs the filtered incoming signal offset by the DC-offset voltage from the voltage divider 332 to the equalizer 230. Also, the first termination resistor $R_{T1}$ is coupled between the first data line 208 and ground, and the second termination resistor $R_{T2}$ is coupled between the second data line 210 and ground.

To enable the DC-coupling mode of operation, a logic zero is input to the AC-couple-enable input 222, a logic one is input to the DC-couple-enable input 227, and a logic zero is input to the DC-offset-compensation-enable input 337. This activates the DC-coupled switch 225 and deactivates the AC-coupled switch 220. As a result, an incoming signal received on the data lines 208 and 210 is coupled to the equalizer 230 via the DC-coupled switch 225. The DC-coupled switch 225 shifts the common-mode voltage of the incoming signal. Also, the first and second termination resistors $R_{T1}$ and $R_{T2}$ are coupled in series between the first and second data lines 208 and 210.

To enable the DC-offset-compensation mode of operation, a logic one is input to the AC-couple-enable input 222, a logic zero is input to the DC-couple-enable input 227, and a logic one is input to the DC-offset-compensation-enable input 337. This blocks incoming signals at the AC-coupled switch 220 by turning off the AC-coupling switches 338 and 340, couples the DC-offset voltage from the voltage divider 332 to the inputs In+ and In− of the equalizer 230, and deactivates the DC-coupling switch 225. As a result, only the DC-offset voltage from the voltage divider 332 is applied to the inputs In+ and In− of the equalizer 230, enabling DC-offset compensation 320 to be performed on the outputs Out+ and Out− of the equalizer 230.

Figure 7:
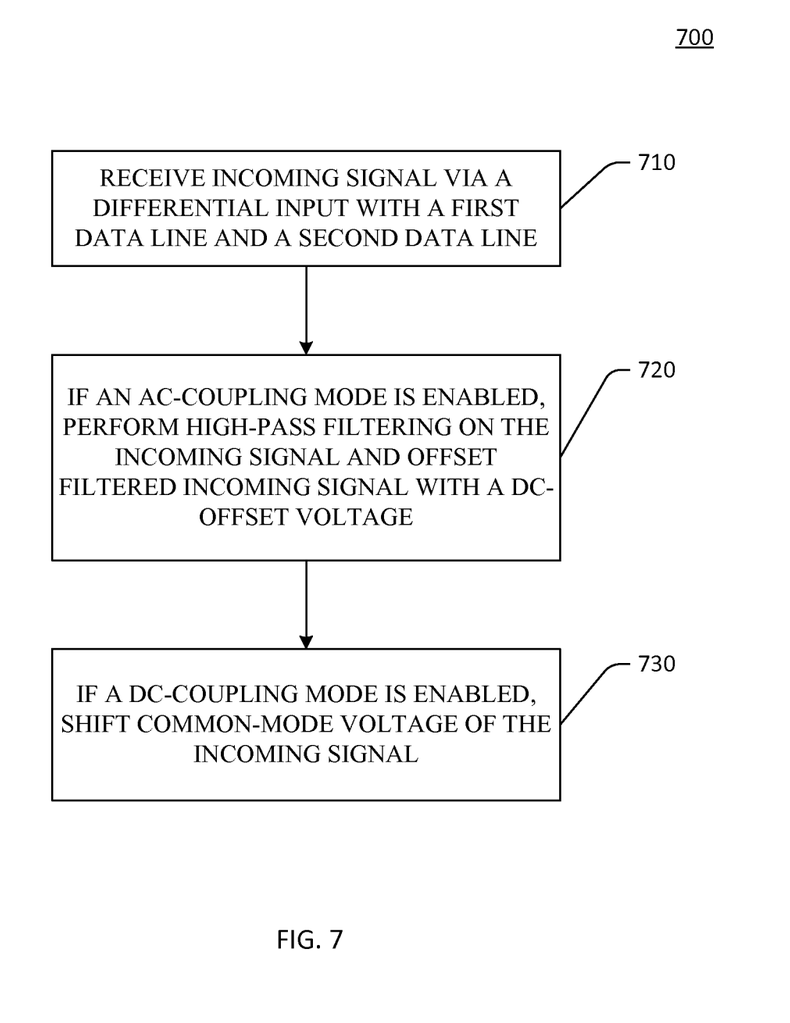
FIG. 7 is a flowchart illustrating a method for handling an incoming signal at a front-end receiver according to an embodiment of the present disclosure.

FIG. 7 is a flow diagram of a method 700 for handling an incoming signal at a front-end receiver according to an embodiment of the present disclosure.

In step 710, the incoming signal is received via a differential input with a first data line and a second data line. For example, the incoming signal may be received from a pair of transmission lines 104 and 106 (e.g., a twisted wire pair).

In step 720, if an AC-coupling mode of the receiver is enabled, high-pass filtering is performed on the incoming signal and the filtered incoming signal is offset with a DC-offset voltage. For example, the incoming signal may be high-passed filtered using capacitors and resistors arranged to form high-pass filters (e.g., the AC-coupling capacitors $C_{ac1}$ and $C_{ac2}$ and the AC-coupling resistors $R_{ac1}$ and $R_{ac2}$). The high-pass filtering passes the AC component of the incoming signal while filtering out (attenuating) any DC component of the incoming signal. The DC-offset voltage may be provided by a voltage divider (e.g., the voltage divider 332). Step 720 may be performed by the AC-coupled switch 220, and the AC-coupling mode may be enabled by inputting a logic one to the AC-couple-enable input 222.

In step 730, if a DC-coupling mode of the receiver is enabled, a common-mode voltage of the incoming signal is shifted. For example, the common-mode voltage of the incoming signal may be shifted by passing the incoming signal through a voltage-level shifter (e.g., the level shifter 352). Step 730 may be performed by the DC-coupled switch 225, and the DC-coupling mode may be enabled by inputting a logic one to the DC-couple-enable input 227.

Although the AC-coupled switch 220 and the DC-coupled switch 225 are coupled to the input of an equalizer in the example discussed above, it should be appreciated that embodiments of the present disclosure are not limited to this example. For example, the AC-coupled switch 220 and the DC-coupled switch 225 may be coupled to the input of an amplifier. In this example, the DC-offset voltage may be set to a voltage that properly biases the input of the amplifier, and the common-mode voltage of the incoming signal may be shifted to a voltage that properly biases the input of the amplifier.

Those skilled in the art would appreciate that the circuits described herein may be realized using a variety of transistor types, and are therefore not limited to the particular transistor types shown in the figures. For example, transistor types such as bipolar junction transistors, junction field effect transistor or any other transistor type may be used. Those skilled in the art would also appreciate that the circuits described herein may be fabricated with various IC process technologies such as CMOS, bipolar junction transistor (BJT), bipolar-CMOS (BiCMOS), silicon germanium (SiGe), gallium arsenide (GaAs), etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A front-end receiver, comprising:
   a differential input with a first data line and a second data line for receiving an incoming signal;
   an AC-coupled switch coupled to the differential input, wherein the AC-coupled switch is configured to both perform high-pass filtering on the incoming signal and offset the filtered incoming signal with a DC-offset voltage in an AC-coupling mode of the receiver; and
   a DC-coupled switch coupled to the differential input, wherein the DC-coupled switch is configured to shift a common-mode voltage of the incoming signal in a DC-coupling mode of the receiver;
   wherein the AC-coupled switch comprises:
      a voltage divider configured to provide the DC-offset voltage;
      a first switch coupled between the voltage divider and a first output line of the AC-coupled switch; and
      a second switch coupled between the voltage divider and a second output line of the AC-coupled switch;
      wherein the first and second switches are turned on in the AC-coupling mode, and the first and second switches are turned off in the DC-coupling mode.

2. The front-end receiver of claim 1, wherein the AC-coupled switch is configured to both block the incoming signal and output the DC-offset voltage in a DC-offset-compensation mode of the receiver.

3. The front-end receiver of claim 1, wherein the DC-coupled switch comprises a voltage-level shifter configured to shift the common-mode voltage of the incoming signal.

4. The front-end receiver of claim 1, further comprising an impedance termination component coupled to the differential input, the impedance termination comprising:
   a third switch;
   a first termination resistor coupled between the first data line and the third switch; and
   a second termination resistor coupled between the second data line and the third switch;
   wherein the third switch is configured to turn on in the AC-coupling mode, and to turn off in the DC-coupling mode.

5. The front-end receiver of claim 1, further comprising:
   an equalizer coupled to the AC-coupled switch and the DC-coupled switch;
   wherein the AC-coupled switch is configured to output the filtered incoming signal offset by the DC-offset voltage to the equalizer in the AC-coupling mode, and the DC-coupled switch is configured to output the voltage-shifted incoming signal to the equalizer in the DC-coupling mode.

6. The front-end receiver of claim 1, wherein the filtered incoming signal is a differential signal comprising a first filtered signal and a second filtered signal, and wherein the AC-coupled switch is configured to offset the filtered incoming signal by:
   shifting a voltage of the first filtered signal by the DC-offset voltage; and
   shifting a voltage of the second filtered signal by the DC-offset voltage.

7. The front-end receiver of claim 1, wherein the AC-coupled switch comprises:
   a first AC-coupling capacitor coupled to the first data line;
   a second AC-coupling capacitor coupled to the second data line;
   a third switch coupled between the first AC-coupling capacitor and the first output line of the AC-coupled switch; and
   a fourth switch coupled between the second AC-coupling capacitor and the second output line of the AC-coupled switch;
   wherein the third and fourth switches are turned on in the AC-coupling mode.

8. The front-end receiver of claim 3, wherein the DC-coupled switch comprises:
   a third switch coupled between the first data line and the voltage-level shifter; and
   a fourth switch coupled between the second data line and the voltage-level shifter;
   wherein the third and fourth switches are turned on in the DC-coupling mode, and the third and fourth switches are turned off in the AC-coupling mode.

9. The front-end receiver of claim 3, wherein the DC-coupled switch further comprises:
   a third switch coupled between a first input of the voltage-level shifter and a power supply; and
   a fourth switch coupled between a second input of the voltage-level shifter and the power supply;
   wherein the third and fourth switches are turned off in the DC-coupling mode, and the third and fourth are turned on in the AC-coupling mode.

10. The front-end receiver of claim 9, wherein the DC-coupled switch comprises:
    a fifth switch coupled between the first data line and the voltage-level shifter; and
    a sixth switch coupled between the second data line and the voltage-level shifter;
    wherein the fifth and sixth switches are turned on in the DC-coupling mode, and the fifth and sixth switches are turned off in the AC-coupling mode.

11. The front-end receiver of claim 4, wherein the third switch is coupled between a node and a ground, the node is between the first and second termination resistors, and the third switch is configured to pull the node to the ground when the third switch is turned on.

12. The front-end receiver of claim 5, wherein the AC-coupled switch is configured to both block the incoming signal from the equalizer and output the DC-offset voltage to the equalizer in a DC-offset-compensation mode of the receiver.

13. The front-end receiver of claim 12, wherein the equalizer has a first output and a second output, and the receiver further comprises an offset compensation circuit configured to detect a voltage difference between the first and second outputs of the equalizer in the DC-offset-compensation mode, and to adjust a voltage of at least one of the first and second outputs of the equalizer to reduce the detected voltage difference.

14. The front-end receiver of claim 7, wherein the first and second switches are turned on and the third and fourth switches are turned off in a DC-offset-compensation mode of the receiver.

15. The front-end receiver of claim 7, wherein the DC-coupled switch comprises:
voltage-level shifter configured to shift the common-mode voltage of the incoming signal;
a fifth switch coupled between the first data line and the voltage-level shifter; and
a sixth switch coupled between the second data line and the voltage-level shifter;
wherein the fifth and sixth switches are turned on in the DC-coupling mode, and the fifth and sixth switches are turned off in the AC-coupling mode.

16. The front-end receiver of claim 15, wherein the first and second switches are turned on and the third, fourth, fifth and sixth switches are turned off in a DC-offset-compensation mode of the receiver.

17. A front-end receiver, comprising:
a differential input with a first data line and a second data line for receiving an incoming signal;
an AC-coupled switch coupled to the differential input, wherein the AC-coupled switch is configured to both perform high-pass filtering on the incoming signal and offset the filtered incoming signal with a DC-offset voltage in an AC-coupling mode of the receiver; and
a DC-coupled switch coupled to the differential input, wherein the DC-coupled switch is configured to shift a common-mode voltage of the incoming signal in a DC-coupling mode of the receiver;
wherein the DC-coupled switch comprises a voltage-level shifter configured to shift the common-mode voltage of the incoming signal, the voltage-level shifter comprising:
a first p-type metal-oxide-semiconductor (PMOS) transistor having a gate coupled to the first data line;
a second PMOS transistor having a gate coupled to the second data line, wherein the gates of the first and second PMOS transistors are driven by the incoming signal if the DC-coupled mode of the receiver is enabled;
a third PMOS transistor having a drain coupled to a source of the first PMOS transistor, and a gate directly coupled to the gate of the second PMOS transistor; and
a fourth PMOS transistor having a drain coupled to a source of the second PMOS transistor, and a gate directly coupled to the gate of the first PMOS transistor.

18. The front-end receiver of claim 17, wherein a drain of the first PMOS transistor is coupled directly to a ground, and a drain of the second PMOS transistor is coupled directly to the ground.

19. A method operable by a front-end receiver for handling an incoming signal, the method comprising:
receiving the incoming signal via a differential input with a first data line and a second data line;
in an AC-coupling mode of the receiver, performing the steps of:
performing high-pass filtering on the incoming signal; and
offsetting the filtered incoming signal with a DC-offset voltage;
in a DC-coupling mode of the receiver
shifting a common-mode voltage of the incoming signal; and
in a DC-offset-compensation mode of the receiver, performing the steps of:
blocking both AC and DC portions of the incoming signal; and
outputting the DC-offset voltage.

20. The method of claim 19, wherein the DC-offset voltage is provided by a voltage divider.

21. The method of claim 19, further comprising:
in the AC-coupling mode, performing the steps of:
coupling a first termination resistor between the first data line and a ground; and
coupling a second termination resistor between the second data line and the ground; and
in the DC-coupling mode, coupling the first and second termination resistors in series between the first and second data lines.

22. The method of claim 19, further comprising:
outputting the filtered incoming signal offset by the DC-offset voltage to an equalizer in the AC-coupling mode; and
outputting the shifted incoming signal to the equalizer in the DC-coupling mode.

23. The method of claim 22,
wherein outputting the DC-offset voltage comprises outputting the DC-offset voltage to the equalizer.

24. An apparatus for handling an incoming signal, the method comprising:
means for receiving the incoming signal via a differential input with a first data line and a second data line;
means for performing high-pass filtering on the incoming signal in an AC-coupling mode;
means for offsetting the filtered incoming signal with a DC-offset voltage in the AC-coupling mode;
means for shifting a common-mode voltage of the incoming signal in a DC-coupling mode;
means for blocking both AC and DC portions of the incoming signal in a DC-offset-compensation mode; and
means for outputting the DC-offset voltage in the DC-offset-compensation mode.

25. The apparatus of claim 24, further comprising means for providing the DC-offset voltage.

26. The apparatus of claim 24, further comprising:
means for coupling a first termination resistor between the first data line and a ground in the AC-coupling mode;
means for coupling a second termination resistor between the second data line and the ground in the AC-coupling mode; and
means for coupling the first and second termination resistors in series between the first and second data lines in the DC-coupling mode.

27. The apparatus of claim 24, further comprising:
means for outputting the filtered incoming signal offset by the DC-offset voltage to an equalizer in the AC-coupling mode; and
means for outputting the shifted incoming signal to the equalizer in the DC-coupling mode.

28. The apparatus of claim 27,
wherein the means for outputting the DC-offset voltage in the DC-offset-compensation mode comprises means for outputting the DC-offset voltage to the equalizer in the DC-offset-compensation mode.

* * * * *